United States Patent Office 3,644,416
Patented Feb. 22, 1972

3,644,416
SUBSTITUTED 9-THIABICYCLONONENES
Edward D. Weil, Yonkers, and Keith J. Smith, Lockport, N.Y., assignors to Hooker Chemical Corporation, Niagara Falls, N.Y.
No Drawing. Continuation-in-part of application Ser. No. 482,297, Aug. 24, 1965, which is a continuation-in-part of application Ser. No. 260,909, Feb. 25, 1963. This application Aug. 23, 1968, Ser. No. 754,980
Int. Cl. C07d 65/04; A01n 9/12
U.S. Cl. 260—327 TH      16 Claims

ABSTRACT OF THE DISCLOSURE

Compounds of the formula

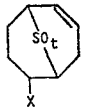

wherein $t$ is from 0 to 2, and X is a substituent selected from the group consisting of halogen, hydrocarbyloxy, hydrocarbylthio, acyloxy, acylthio, amino or substituted amino, carboxyl, or salt, nitrile, amide, ester or acid halide of carboxyl, —NCO and —NCS.

---

This application is a continuation-in-part of our application S.N. 482,297, filed Aug. 24, 1965, now abandoned, which is a continuation-in-part of our application S.N. 260,909, filed Feb. 25, 1963, now abandoned.

This invention relates to new compositions of matter and to the processes for producing them. More specifically, this invention is concerned with novel bicyclic sulfur-containing olefins, processes of preparation and utilities thereof.

The novel compounds of the present invention are best described by the term 6-substituted-9-thiabicyclo[3.3.1]-2-nonenes, 9-oxides thereof and 9,9-dioxides thereof as represented by the following formula (numbering shown):

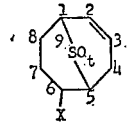

wherein $t$ is an integer from 0 to 2 and X is a substituent selected from the group consisting of (1) Halogen;
(2) A radical of the formula RZ where R is a monovalent radical selected from the group consisting of hydrogen, hydrocarbyl and acyl, and Z is an element of Group VI of the Periodic Table possessing an atomic number of from 8 to 16, inclusive;
(3) A radical of the formula

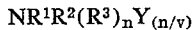

wherein $R^1$ and $R^2$ are radicals selected from the group consisting of hydrogen, acyl and hydrocarbyl, $R^3$ is a radical selected from the group consisting of hydrogen and hydrocarbyl, $n$ is an integer from 0 to 1, inclusive, $n$ being 0 when either $R^1$ and $R^2$ is acyl, and Y is an anion of valence $v$;
(4) A carboxyl radical and the salts, nitrile, amides, esters and acid halides thereof; and
(5) A radical of the formula

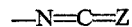

wherein Z is an element of Group VI of the Periodic Table possessing an atomic number of from 8 to 16, inclusive.

The compounds of this invention are prepared through a novel intermediate, 6-chloro - 9 - thiabicyclo[3.3.1]-2-nonene corresponding to the above structure wherein X is chlorine. This novel intermediate is conveniently produced in good yield by the thermal dehydrochlorination of 2,6-dichloro-9-thiabicyclo[3.3.1]nonane, described in our copending application S.N. 482,261 and our French Pat. 1,412,937, as a novel compound produced by the addition of sulfur dichloride to 1,5-cyclooctadiene.

The reaction proceeds readily under mild conditions, and comprises heating 2,6-dichloro-9-thiabicyclo[3.3.1] nonane at a temperature between about 110 degrees centigrade and about 220 degrees centigrade, preferably 130 degrees centigrade to 200 degrees centigrade, for several minutes at the higher temperatures to several days at the lower temperatures, until evolution of the hydrogen chloride occurs. It is not necessary to eliminate exactly one molar equivalent of hydrogen chloride, although this is nearly optimum; if more or less hydrogen chloride is eliminated, the desired product can readily be separated by fractional distillation from by-products and/or from unreacted starting material. Resinous by-products may be minimized by conducting the reaction to somewhat less than 100 percent conversion.

The analogous reaction may also be conducted on other 2,6 - dihalo-9-thiabicyclo[3.3.1]nonanes, such as the difluoro, dibromo and diiodo-compounds.

While the reaction requires no solvent, an inert solvent can be used if desired to facilitate heat transfer or temperature control, or to aid in expulsion of the evolved hydrogen chloride. Suitable solvents, include aromatic or aliphatic hydrocarbons such as xylene, cumene, octane, Decalin or Tetralin; chlorinated hydrocarbons such as tetrachloroethane, dichlorobenzene, trichlorobenzene; anisole; nitrobenzene; diphenyl ether, and other solvents resistant to hydrogen chloride.

No catalyst is required in the process of the invention. However, the reaction can be accelerated by Lewis acids (such as $FeCl_3$, $ZnCl_2$, $SbCl_5$, $NiCl_2$, $CoCl_2$, and other heavy metal salts having Lewis acid properties, as are well known to the art), and surface-active solids having Lewis acid properties, such as alumina, clay, and activated carbon, for example. To avoid resinification of the product it is well to employ only minor amounts of such catalysts, from about one part per million to about 5 percent being the usual proportion.

The compounds wherein the X substituent is halogen include the 6-fluoro-, 6-chloro-, 6-bromo- and 6-iodo-9-thiabicyclo[3.3.1]-2-nonenes. The compounds wherein X is halogen other than chlorine are conveniently made from 6-chloro-9-thiabicyclo[3.3.1]-2-nonene by treatment with a halogen-exchanging nucleophilic reagent. For example, the 6-fluoro-9-thiabicyclo[3.3.1]-2-nonene is made by treating the chloro analog with sodium fluoride, potassium fluoride, or other metal fluoride, preferably in an ionizing solvent such as dimethylformamide, dimethylsulfoxide, tetramethylene sulfone, water (optionally with an organic cosolvent), nitrobenzene, dioxane, or the like. 6-bromo-9-thiabicyclo[3.3.1]-2-nonene can be made from the chloro analog by treatment of the latter with hydrogen bromide in an ionizing solvent such as glacial acetic acid. 6-iodo-9-thiabicyclo[3.3.1]-2-nonene can be made by treating 6-chloro - 9 - thiabicyclo[3.3.1] - 2 - nonene with hydrogen iodide or a metal iodide such as sodium iodide in an ionizing solvent such as an alcohol, acetic acid, acetone, water (possibly with a co-solvent), dioxane, or the like. These halogen exchange reactions can be conducted at from about −10 degrees centigrade to +150 degrees centigrade, preferably between the freezing point and the boiling point of the solvent.

The compounds of the invention wherein the X substituent is selected from the group consisting of hydroxy, mercapto, acyloxy, acylmercapto, hydrocarbyloxy and hydrocarbylmercapto may be alternatively designated as those compounds of the invention wherein X represents a radical RZ where R is a monovalent radical selected from the group consisting of hydrogen, acyl and hydrocarbyl radicals (the term hydrocarbyl refers to the radical obtained by removal of a hydrogen atom from a carbon atom of hydrocarbon and thus encompasses alkenyl, alkynyl, alkyl, cycloalkyl, cycloalkenyl, arylalkyl and aryl. Substituted hydrocarbyls may also be employed, wherein there are present non-interfering substituents such as halogen, alkyl of 1 to 8 carbon atoms, alkoxy of 1 to 8 carbon atoms, and the like). Z is an element of Group VI of the Periodic Table having an atomic number between 8 and 16 (i.e., oxygen or sulfur). In general, the present compounds may be produced by reaction of 6-chloro-9-thiabicyclo[3.3.1]-2-nonenes with a nucleophilic reagent RZM, where M is a cation (metal, proton, ammonium or substituted ammonium).

Where the hydrocarbonyl radical is stated herein, it is to be understood that no upper limit of size of said radical need be imposed. However, where the hydrocarbyl radical is monovalent, it is preferred that said hydrocarbyl radical have from 1 to 20 carbon atoms.

The compound wherein X is hydroxy may be designated as 9-thiabicyclo[3.3.1]-6-nonen-2-ol. It may be conveniently produced by reaction of 6-halo-9-thiabicyclo [3.3.1]-2-nonene with an aqueous base such as sodium hydroxide, other basic metal hydroxides, carbonates, or bicarbonates, preferably in water. The reaction can be accelerated by use of a water-miscible organic co-solvent such as dioxane, acetone, dimethylformamide, tetrahydrofuran, or the like. Temperatures of from −10 degrees centigrade to +150 degrees centigrade are suitable, obviously taking into consideration any further limitation due to the freezing point and boiling point of the chosen solvent. This compound may also be made by saponifying its esters (where X is acyloxy).

The compound of the invention wherein the X substituent is acyloxy includes all those compounds having the grouping acyl —O— where acyl is defined in its customary way as the radical derived from an acid by the removal of an OH group. Thus, both organic and inorganic acyl groups are intended. Examples of compounds of the invention having X equal to acyloxy include acyloxy groups of 1 to 20 carbon atoms, such as, 6-formyloxy-, acetoxy-, propionoxy-, butyroxy-, stearyloxy-, acryloxy-, methacryloxy, oleyloxy-, chloroacetoxy-, chloroformyloxy-, trichloroacetoxy-, bromopropionoxy-, α,α-dichloropropionoxy-, lactoxy-, cyclohexanecarbonyloxy-, N-methylcarbamyloxy-, abietoxy-, benzoyloxy-, trichlorobenzoyloxy-, 3,5-dinitrobenzoyloxy-, toluyloxy-, naphthoyloxy-, 2,4-dichlorophenoxyacetoxy-, trichlorophenylacetoxy-, furoyloxy-, nicotinoyloxy-, maleyloxy- (mono- and bis-ester), succinoyloxy- (mono- and bis-ester), adipoyloxy- (mono- and bis-ester), phthaloyloxy- (mono- and bis-ester), p-toluenesulfonyloxy-, methanesulfonyloxy-, dimethoxyphosphinyloxy-, diethoxyphosphinyloxy-, dimethoxyphosphinothioyloxy-, diethoxyphosphinothioyloxy-, 6-(3-,4-dichlorocarbaniloxy)- and 6-(3-chlorocarbaniloxy)-9-thiabicyclo[3.3.1]-2-nonenes. Also included are the acid and neutral sulfate, sulfite, phosphite and phosphate esters of 9-thiabicyclo[3.3.1]-6-nonen-2-ol. In general, these compounds may be made by treating the corresponding alcohol with the acid chloride or anhydride of the acid corresponding to the acyl group. The reactions can usually be accelerated by having present one molar equivalent of a base such as pyridine, triethylamine, soda ash, or the like. Where a carbamyloxy group is to be introduced, the corresponding isocyanate is the anhydride to be employed. Alternatively, these compounds can be made by reaction of 6-halo-9-thiabicyclo[3.3.1]-2-nonene with the acid or the salt of the acid corresponding to the desired acyl group. While ordinarily this procedure works poorly for preparation of a cycloaliphatic ester, in the present case it gives generally excellent results. It will be obvious to one skilled in the art that the acid or its salts to be employed must be adequately stable and thus the carbamates cannot be made in this way. It will further be obvious that nucleophilic displacement types are best performed in an ionizing solvent such as water, alcohol, or the like. Conveniently, an excess of the acid (corresponding to the desired acyl group) can be used as solvent.

The compound of the invention where the substituent X is mercapto may be designated as 6-mercapto-9-thiabicyclo [3.3.1]-2-nonene. It may be made by reaction of the compound where X equals halogen with a sulfhydrate salt such as sodium sulfhydrate or potassium sulfhydrate, preferably in an ionizing solvent such as water (optionally with a cosolvent), alcohol, dimethylformamide, or the like. The mercaptan may also be prepared by saponifying its thiol esters.

The compounds of the invention wherein the X substituent is acylmercapto (=acylthio) include all the mercapto analogs of the compounds mentioned in connection with the compounds where X is acyloxy. The meaning of acyl is the same. The methods of preparation are completely analogous, simply employing the mercaptan in place of the alcohol in reaction with the acyl chloride or anhydride or isocyanate, or employing the thiol acid or its salt in place of the oxygen acid or its salt in reaction with 6-chloro-9-thiabicyclo[3.3.1]-2-nonene.

Examples of compounds of the invention wherein X is acylmercapto (acylthio) include 6-acetylthio-, propionylthio-, caproyloylthio-, stearylthio-, chloroacetylthio-, thiobenzoylthio-, benzoylthio-, and naphthoylthio-9-thiabicyclo[3.3.1]-2-nonene. Also within this group are the S-9-thiabicyclo[3.3.1]-2-nonene-(6)-yl esters of the following acids: O,O-dimethyl phosphorodithioic acid, O,O-diethylphosphorodithioic acid, other O,O-di(hydrocarbyl)phosphorodithioic and -thioic acids, O-methyl phenylphosphonodithioic acid, O-ethyl phenylphosphonodithioic acid, O-methyl methanephosphonothioic acid and -dithioic acid, other O-hydrocarbyl P-hydrocarbyl phosphonothioic and -dithioic acids, dimethylphosphinodithioic acid, other di-(hydrocarbyl)phosphinodithioic acids, O-methylxanthic acid, other O-hydrocarbyl xanthic acids, S-methyldithiocarbonic acid, other S-hydrocarbyldithiocarbonic acids, S-methyltrithiocarbonic acid, S-ethyltrithiocarbonic acid, S-butyltrithiocarbonic acid, S-phenyltrithiocarbonic acid, other S-hydrocarbyltrithiocarbonic acids, S-metal salts of trithiocarbonic acid, thiocarbamic acid, dithiocarbamic acid, N-methylthiocarbamic acid, N-ethylthiocarbamic acid, N-phenylthiocarbamic acid, N-3,4-dichlorophenyl thiocarbamic acid, N,N-dimethylthiocarbamic acid, N,N-diethylthiocarbamic acid, N,N-dibutylthiocarbamic acid, N-methyldithiocarbamic acid, N-ethyldithiocarbamic acid, N-butyldithiocarbamic acid, N-phenyldithiocarbamic acid, N,N-dimethyldithiocarbamic acid, N,N-diethyldithiocarbamic acid, N,N-dipropylthiocarbamic acid, N,N-diisopropyldithiocarbamic acid, N,N-di-n-butyldithiocarbamic acid, N,N-diallyldithiocarbamic acid, N,-methyl-N-methoxyethyldithiocarbamic acid, and other N-hydrocarbyl and N,N-dihydrocarbyl thio- and dithiocarbamic acids, also thiosulfuric and trithiophosphorous and trithiophosphoric acids, as well as other thio-acids.

An especially useful class of novel compounds embraced within the present invention, which compounds possess high contact and systemic insecticidal activity as well as miticidal activity, are represented by the following formula:

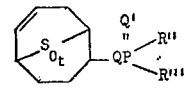

wherein Q and Q' are selected from the group consisting of the elements of Group VI of the Periodic Table having an atomic number from 8 to 16, as for example, sulfur and oxygen, R" and R''' are selected from the group consisting of alkyl, alkoxy, alkylthio, wherein the alkyl radicals contain from 1 to about 12 carbon atoms and preferably from 1 to about 3 carbon atoms, and $t$ is a number from 0 to 2.

Compounds wherein the X group equals hydrocarbyloxy and hydrocarbylmercapto (hydrocarbylthio) may be alternatively described as those compounds where X equals R'—Z— where Z is an element of Group VI of the Periodic Table and atomic number of 8 to 16 and R' is a hydrocarbyl radical. Examples of 9-thiabicyclo[3.3.1]-2-nonenes where the X substituent in the 6-position is hydrocarbyloxy include methoxy-, ethoxy-, propoxy-, isopropoxy-, octadecyloxy-, allyloxy-, propargyloxy-, 2-chloroethoxy-, 2-bromoethoxy-, methoxyethoxy-, 2-hydroxyethoxy-, hydroxyethoxyethoxy-, carboxymethoxy-, 1-carbomethoxypropoxy-, cyclohexyloxy-, vinyloxy, phenoxy-, 2,4-dibromophenoxy-, pentachlorophenoxy-, cresoxy-, 2,4-dinitro-o-cresoxy-, p-nitrophenoxy-, nonylphenoxy-, o-hydroxyphenoxy-, p-hydroxyphenoxy-, m-hydroxyphenoxy-, p-methoxyphenoxy-, o-carboxyphenoxy-, benzyloxy-, 2-carboxy-3,6-dichlorophenoxy-, o-carbomethoxyphenoxy-, α-naphthoyloxy-, furfuryloxy- and α-pyridoxy-9-thiabicyclo[3.3.1]-2-nonene. The hydrocarbyl radical may have more than one free valence, thus compounds such as 1,2-bis(9-thiabicyclo[3.3.1]-2-nonenyloxy)ethane, 1,2,3-tris-(9-thiabicyclo[3.3.1]-2-nonen-6-yloxy)propane, and even highly polyvalent species such as the poly(9-thiabicyclo-2-nonenyloxy)ethylene derived from polyvinyl alcohol are included within the scope of the compounds of the invention wherein X is hydrocarbyloxy. Also included in this subgroup is bis(9-thiabicyclo[3.3.1]-2-nonen-6-yl)ether. Where the hydrocarbyl radical is monovalent, it is preferred that it have from 1 to 20 carbon atoms.

Examples of 9-thiabicyclo[3.3.1]-2-nonenes where the X substituent in the 6-position equals hydrocarbylmercapto (=hydrocarbylthio) include methylmercapto-, ethylmercapto-, dodecylmercapto-, octadecylmercapto-, allylmercapto-, ethoxyethylmercapto-, 3-chloropropylmercapto-, 2-hydroxyethylmercapto-, carboxymethylmercapto-, phenylmercapto-, cresylmercapto-, p-chlorophenylmercapto-, 2,4,5-trichlorophenylmercapto-, 2-hydroxyphenylmercapto-, benzylmercapto-, p-chlorobenzylmercapto-, furfurylmercapto-, and α-pyridinemercapto-9-thiabicycl-2-nonene, and in general all mercapto analogs of the hydrocarbyloxy compounds named above.

In general, the most convenient synthesis for the compounds wherein X equals hydrocarbyloxy or hydrocarbylmercapto, i.e., X=R'Z as above defined, is reaction of the chloro-9-thiabicyclo-2-nonene of the invention with R'ZM where M is a cationic species. M may represent hydrogen, a metal cation, an ammonium cation, or a substituted ammonium cation such as trialkylammonium. Where Z is oxygen, M is preferably hydrogen or a metal cation. Where Z is sulfur, M is preferably hydrogen, a metal cation, ammonium or substituted ammonium. The reaction is conducted preferably by admixing the reactants in a liquid phase capable of dissolving at least some of each reactant. Where Z is oxygen, the alcohol R'ZH is a convenient medium although ketones, ethers, or other polar solvents are useful as well. Where Z is sulfur, an alcohol or ether is a convenient medium. It will be understood by one skilled in the art that the best solvent and the optimum cation M will vary depending on R' and Z. Temperatures of from −10 degrees centigrade to +150 degrees centigrade are generally used, but lower and higher temperatures are workable.

An alternative method of synthesis is to react R'Y, where Y is a nucleophilically displaceable electronegative group such as halide or sulfate, with a hydroxy- or mercapto-9-thiabicyclo-2-nonene or salt thereof. Such a reaction is of the type well known per se as alkylation or arylation of an alcohol or mercaptan. For example, 6-methoxy-9-thiabicyclo[3.3.1]-2-nonene may be made by reacting 9-thiabicyclo[3.3.1]-6-nonen-2-ol with methyl sulfate preferably in the presence of a base such as pyridine. Special methods are available for certain of these compounds. For instance, where X is vinyloxy, the compound may be made by adding acetylene to 9-thiabicyclo[3.3.1]-6-nonen-2-ol preferably in the presence of a strong base catalyst.

Compounds wherein X is amino-, acylamino-, or hydrocarbyl-substituted amino may be defined in more detail as compounds where $X=NR^1R^2(R^3)_n Y_{(n/v)}$, where R1 and R2 are radicals chosen from the group consisting of hydrogen, acyl and hydrocarbyl, where said radicals may be conjoined and which together with the nitrogen may comprise a heterocyclic ring, and where $n$ is an integer chosen from 0 and 1, and where $n$ is 1 said compounds have a positive charge on the nitrogen electrostatically counterbalanced by an anion Y of valence $v$, and where $n$ is zero if $R^1$ and/or $R^2$ are acyl. Examples of compounds of this type where $n$ is zero include 6-amino-, methylamino-, dimethylamino-, butylamino-, octadecylamino-, didodecylamino-, 2-hydroxyethylamino-, 2-methoxypropylamino-, benzylamino-, anilino-, p-chloroanilino-, N-methylanilino-, cyclohexylamino-, allylamino-, propargylamino-, cyclopentenylamino-, α-naphthylamino-, piperidino-, morpholino-, acetamido-, benzamido-, phthalamido-, and phthalimido-9-thiabicyclo-[3.3.1]-2-nonenes. Examples of compounds in which $n$ is 1 include the hydrochloride of 6-amino-9-thiabicyclo[3.3.1]-2-nonene,
N,N,N-trimethyl-N-(9-thiabicyclo[3.3.1] - 2 - nonenyl) ammonium chloride,
N,N - dimethyl - N - lauryl-N-(9-thiabicyclo[3.3.1]-2-nonenyl)ammonium chloride,
N-(9-thiabicyclo[3.3.1] - 2 - nonenyl)pyridinium chloride, and
dimethylamino-9-thiabicyclo[3.3.1]-2-nonenyl sulfate.

Further examples of compounds of this class were $n$ equals 0, $R^1$ equals acyl and $R^2$ equals hydrogen include more complex examples, such as, the following (where $C_8H_{11}S$ represents 9-thiabicyclo[3.3.1]nonen-6-yl):

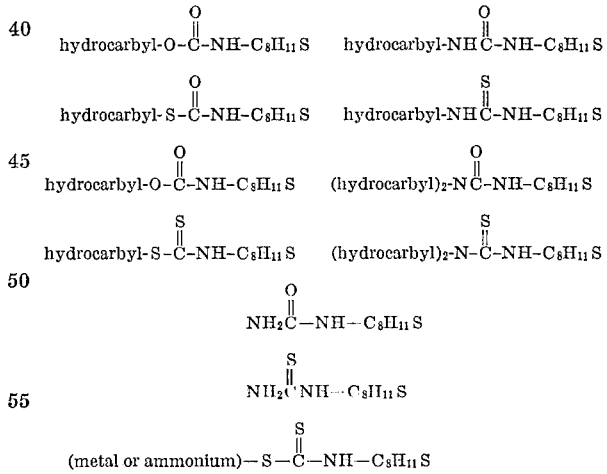

Hydrocarbyl in the above examples may be methyl, ethyl, propyl, isopropyl, allyl, octadecyl, phenyl, p-nitrophenyl, 2,4,5-trichlorophenyl, benzyl, or any other hydrocarbyl radical. This group of acylamino compounds is conveniently prepared from 6 - isocyanato-9-thiabicyclo [3.3.1]-2-nonene or 6-isothiocyanato-9-thiabicyclo[3.3.1]-2-nonene by reaction with alcohols, mercaptans, metal sulfhydrates, ammonium sulfhydrates, ammonia, primary amines or secondary amines, e.g. alkyl amines. Suitable metals include sodium, potassium, zinc, copper, manganese, iron, barium, lead, or any other metal capable of forming dithiocarbamates.

In general, the compounds of the invention wherein X is $NR^1R^2(R^3)_n$ may be prepared by contacting the chloro-9-thiabicyclo-2-nonene of the invention with an amine $H_{1-n}NR^1R^2(R^3)_n$, where $R^1$, $R^2$, $R^3$ and $n$ are as defined above. It is preferred where $R^1$ and/or $R^2$ in the final product is acyl, to employ an amine having hydrogen in place of R¹ and/or R² and then to acylate the resultant amino-9-thiabicyclo-2-nonene to introduce R¹ and/or R² in place of said hydrogen. Suitable acylating agents are acids (R¹OH), anhydrides (R¹—O—R¹) and acid chlorides (R¹Cl) for example.

The compound of the invention wherein X represents cyano may be produced by reaction of 2-chloro-9-thiabicyclo[3.3.1]-2-nonene with a metal cyanide such as sodium cyanide, potassium cyanide, cuprous cyanide, or directly with hydrogen cyanide, preferably in a polar organic solvent such as dioxane, acetone, alcohols, dimethylformamide, dimethylsulfoxide, pyridine, or the like.

Compounds of the invention wherein X equals carboxyl or carboxamido are made by hydrolyzing the corresponding nitriles, by means which will be obvious to one skilled in the art. It will also be obvious that the carboxylic acid compounds of the invention can be converted to salts, esters, amides, e.g. anhydrides, acid halides, and other types of carboxylic acid derivatives, using methods known per se.

The compound of the invention wherein X equals isothiocyano may be produced by reaction of 6-chloro-9-thiabicyclo[3.3.1]-2-nonene with a metal thiocyanate or ammonium thiocyanate, preferably in a polar organic solvent such as acetone, dioxane, dimethylformamide, dimethylsulfoxide, or the like.

The compound of the invention wherein X equals isocyanato may be produced by reaction of 6-chloro-9-thiabicyclo[3.3.1]-2-nonene with a metal cyanate or ammonium cyanate, preferably in a polar nonhydroxylic solvent such as acetone, dioxane, dimethylformamide, dimethylsulfoxide, or the like. Alternatively, the isocyanate may be made by treating the amino-9-thiabicyclononane with one molar equivalent of phosgene at elevated temperature, from about 50 degrees centigrade to 250 degrees centigrade, until two molar equivalents of hydrogen chloride are released.

Where the 9-oxide or 9,9-dioxide are to be produced. the corresponding sulfide having the desired X group is oxidized by contacting it with one or two equivalents, respectively, of a sulfide-oxidizing reagent. Prior to the oxidation, the replacement of the halogen atoms by X substituents can be effected if desired as described herein. Illustrative oxidizing agents used include hydrogen peroxide, peracetic acid, perbenzoic acid, perphthalic acid, or other peroxy organic acids, nitric acid, nitrogen dioxide or tetroxide, permanganates, chromic acid or dichromates, bromic acids or bromates, hypochlorous acid, chlorine plus water, bromine plus water, or ozone. Molecular oxygen may also be employed, preferably using a catalyst such as vanadium oxide, nitrogen oxides, or the like.

The new compounds of the invention have utility as chemical intermediates, as pesticides, as extreme pressure lubricating oil and cutting oil additives, and as monomers and comonomers for resin synthesis.

Compounds of the invention exhibit activity on microorganisms, i.e., on fungi, bacteria, and in some cases nematodes.

As will be shown hereinafter in the examples, the attachment of particular X groups also yields compounds variously having utility as insecticides, pest repellants, surfactants, plant growth regulators and herbicides.

In general, when the compounds of the present invention are employed as pesticides, they will be applied in rates ranging from between about 0.1 pound per acre up to several hundred pounds per acre, the amount depending on crop sensitivity, weather conditions and other factors known to those skilled in the art.

While the compounds of the instant invention may be utilized as pesticides in the pure form, they may be conveniently employed in the form of formulations which in many instances enhance pesticidal activity. Suitable formulations include solutions of the pesticide compound in a solvent such as petroleum hydrocarbons, i.e., xylene, heavy aromatic naphthas and the like, and aqueous dispersions or emulsions generally containing surface active agents such as those listed in "Soap and Chemical Specialties," volume 31, No. 7, pages 50–61, No. 8, pages 48–61, No. 9, pages 52–67 and No. 10, pages 38–67 (1955). Also useful are solid formulations of the compounds of the instant invention. For example, solid carriers such as talc, silica, vermiculite and clay may be utilized in the formulation. The solid formulation may also contain surface active agents, sticking agents, stabilizing agents, or binders, to facilitate their application.

The compounds of the instant invention may further be formulated with other pesticides, as for example, other fungicides such as sulfur, the fungicidal dithiocarbamates, dodecylguanidine, nitropolychlorobenzenes and various fungicidal compounds containing chlorinated alkylthio groups such as captan. Further, the compounds of the present invention may be formulated with insecticides such as the chlorinated hydrocarbon insecticides, the phosphate insecticides, and the carbamate insecticides and with herbicides such as sodium chlorate, sodium borate, 2,4-D, the herbicidal triazines, herbicidal ureas and the herbicidal uracils.

Further, the compounds of the present invention may be formulated with synergists that serve to enhance the pesticidal activity, for example, piperonyl butoxide and the like. It is, of course, appreciated that any pesticidal compound may be used in combination with the compounds of the present invention which may serve to enhance, complement, or synergize said compounds.

In the examples, specification and claims, the term "parts" indicates parts by weight unless otherwise stated while all temperatures are given in degrees centigrade unless otherwise stated.

The following examples are given for purposes of illustration and are not to be understood as limiting as obvious modifications will occur to those skilled in the art.

EXAMPLE 1

6-chloro-9-thiabicyclo[3.3.1]-2-nonene 2,6-dichloro-9-thiabicyclo[3.3.1]nonane (211 grams, 1 mole) was melted and held at 166–184 degrees centigrade with a slow nitrogen purge until one mole of hydrogen chloride had been collected in a water-filled trap attached to the reactor outlet, this requiring 20 hours. The residual liquid was then distilled through a short packed column to obtain 148 grams (85 percent) of colorless liquid, boiling point 64–69 degrees centigrade (0.3 millimeter), $N_D^{25}$ 1.5713.

*Analysis.*—Calculated for $C_8H_{11}ClS$ (percent): Cl, 20.3; S, 18.35 (molecular weight 174.7). Found (percent): Cl, 19.9; S, 18.29 (molecular weight 179 (by boiling point elevation in tetrahydrofuran)).

EXAMPLE 2

6-chloro-9-thiabicyclo[3.3.1]-2-nonene 9-oxide 17.5 parts of 6-chloro-9-thiabicyclo[3.3.1]-2-nonene were dissolved in 100 parts by volume of glacial acetic acid. To this solution was gradually added 11.4 parts by volume of 30 percent hydrogen peroxide. The exotherm was allowed to reach 76 degrees centigrade. When the heat subsided, the reaction mixture was warmed on the water bath to 95 degrees centigrade for 15 minutes. The reaction mixture was then diluted with 1000 parts of water and the organic product was extracted with chloroform. The extract was evaporated under vacuum to obtain a viscous oily residue, which solidified on prolonged standing.

*Analysis.*—Calculated for $C_8H_{11}SOCl$ (percent): Cl, 18.7 Found (percent): Cl, 16.7.

This product when sprayed on two-spotted mites at 0.1 percent concentration in aqueous dispersion gave substantially complete kill in 24 hours.

Infrared showed a small contamination by an acetate ester which accounts for the slightly low percent chlorine.

EXAMPLE 3

Bis(9-thiabicyclo[3.3.1]-2-nonen-6-yl)amine and 9-thiabicyclo[3.3.1]-2-nonen-6-ylamine To 100 parts by volume of 10 percent solution of ammonia in ethanol is added 17.4 parts of chloro-9-thiabicyclonene (Example 1). Afer the solution stands for five days, 200 parts of 10 percent aqueous sodium hydroxide is added. A solid precipitate which forms is removed by filtration and is found to comprise 3 parts of the bis(9-thiabicyclononenyl)amine, apparently a mixture of stereoisomers, melting point 113–144 degrees centigrade.

*Analysis.*—Calculated for $C_{16}H_{23}S_2N$ (percent): N, 4.78. Found (percent): N, 4,74.

The alkaline filtrate is evaporated to remove alcohol, and extracted with ether. The ether is dried over potassium carbonate and then evaporated to obtain 7 parts of 9-thiabicyclononenylamine as waxy crystals of unsharp melting point. The infrared spectrum indicates the presence of a C=C linkage and an amino group.

*Analysis.*—Calculated for $C_8H_{13}SN$ (percent): N, 9.0. Found (percent): N, 8.2.

Both products are insoluble in water and soluble in dilute aqueous NCl. 9-Thiabicyclo[3.3.1]-2-nonen-6 - ylamine when admixed at 64 parts per million with soil infested with spores of Pythium permits bean seedlings to germinate and develop normally, whereas the seedlings are destroyed by fungal attack in the absence of the chemical.

EXAMPLE 4

9-thiabicyclo[3.3.1]-6-nonen-2-yl isocyanate and N-9-thiabicyclo[3.3.1]-6-nonen-2-yl-N',N'-dimethylurea A mixture of 17.4 grams (0.1 mole) of 6-chloro-9-thiabicyclo[3.3.1]-2-nonene, 8.5 grams (0.015 mole) of potassium cyanate, and 320 millilters of dry dimethylformamide was stirred at room temperature. A mild exotherm to 33 degrees centigrade occurred. After stirring overnight, the mixture was filtered. The salts were found by Volhard titration to contain 0.09 mole of potassium chloride. One half of the filtrate was evaporated to dryness under aspirator vacuum on the steam bath, yielding a light yellow semi-solid residue having a characteristic isocyanate odor and exhibiting a strong infrared band at 4.42μ (—N=C=O). The material was contaminated with at least one component exhibiting infrared bands at 3.01μ (NH), and 5.96 (urea C=O). To the unevaporated half of the filtered reaction mixture, 13.5 milliliters of a benzene solution of dimethylamine (3.85 meq./milliliter) was added and after one half hour the mixture was evaporated under aspirator vacuum to a pot temperature of 100 degrees centigrade. The residue was triturated with benzene and the solids filtered off to obtain 4.5 grams of colorless crystalline solid, melting point 215–217 degrees centigrade. Recrystallization from benzene or ethanol raised the melting point to 219–220 degrees centigrade.

*Analysis.*—Calculated for $C_{11}H_{18}ON_2S$ (percent): C, 58.37; H, 8.01; S, 14.17; N, 12.38. Found (percent): C, 58.20; H, 8.29; S, 13.88; N, 12.06.

This product when applied at the rate of 4 pounds per acre to an area infested with seeds of ragweed and pigweed completely prevents weed emergence and growth, showing the compound to have herbicidal activity.

The product is oxidized to the corresponding sulfoxide $C_{11}H_{18}O_2N_2S$ by standing for 20 hours with one molar equivalent of hydrogen peroxide in glacial acetic acid. The sulfoxide is a colorless crystalline solid of unsharp melting point (mixture of stereoisomers). The corresponding sulfone $C_{11}H_{18}O_2N_2S$ is prepared by heating the sulfoxide for one hour at 100 degrees centigrade with one molar equivalent of hydrogen peroxide in glacial acetic acid. The sulfone is a colorless crystalline product, melting point above 300 degrees centigrade, and also exhibits herbicidal properties.

EXAMPLE 5

6-chloro-9-thiabicyclo[3.3.1]-2-nonene 9,9-dioxide

To a solution of 52.5 grams (0.3 mole) of 6-chloro-9-thiabicyclo[3.3.1]-2-nonene in 300 millimilters of glacial acetic acid was added 85.2 grams (0.75 mole) of 30 percent hydrogen peroxide over 20 minutes, with stirring, allowing the temperature to rise to the boiling point. The mixture was then heated at the steam bath for 20 minutes, added to 3 liters of water and extracted with 400 milliliters of chloroform. The extracts were dried over magnesium sulfate, filtered, evaporated to remove the chloroform and the residue recrystallized from acetic acid to obtain 38 grams of colorless crystals, melting point 114–116 degrees centigrade. Recrystallization from acetic acid afforded 34 grams (55 percent yield), melting point 119–120 degrees centigrade; from methanol, 120.5–121.5 degrees centigrade. The infrared spectrum (Nujol mull) showed a C=C band at 1646 cm.$^{-1}$ and —SO$_2$— bands at 1119 and 1297 cm.$^{-1}$.

*Analysis.*—Calculated for $C_8H_{11}O_2ClS$ (percent): C, 46.48; H, 5.36; Cl, 17.16; S ,15.51. Found (percent): C, 46.52; H, 5.33; Cl, 17.20; S, 15.47.

EXAMPLE 6

9-thiabicyclo[3.3.1]-6-nonen-2-ol

To a mixture of 52.5 grams (0.3 mole) of 6-chloro-9-thiabicyclo[3.3.1]-2-nonene (0.3 mole) in 100 milliliters of ethylene glycol dimethyl ether was added 120 grams of 10 percent aqueous sodium hydroxide (0.3 mole), then the mixture was stirred and heated at reflux for 24 hours. The mixture was then evaporated on the steam bath until the upper (organic layer) had disappeared, and the precipitated solids were then filtered out to obtain 44 grams of crude product. This product was recrystallized from hot water (discarding insoluble material) to obtain 32 grams (68 percent yield) of colorless microcrystalline product, melting point 176–177 degrees centigrade. The infrared spectrum of a 0.003 molar solution in carbon tetrachloride showed a single sharp band at 3621 cm.$^{-1}$ in the OH stretching region.

*Analysis.*—Calculated for $C_8H_{12}OS$ (percent): C, 61.50; H, 7.74; S, 20.52. Found (percent): C, 61.65; H, 7.68; S, 20.49.

EXAMPLE 7

9-thiabicyclo[3.3.1]-6-nonen-2-ol 9,9-dioxide

To 160 grams (0.0103 mole) of 9-thiabicyclo[3.3.1]-6-nonen-2-ol in 30 milliliters of glacial acetic acid at 10 degrees centigrade was added 2.7 grams of 30 percent hydrogen peroxide. After two hours at 10–25 degrees centigrade, the mixture was warmed at 80 degrees centigrade for 40 minutes, then evaporated to dryness and the residue recrystallized from ethyl acetate to obtain 0.9 gram (47 percent yield) of colorless solid, melting point 261–262 degrees centigrade. The infrared spectrum showed —SO$_2$— bands at 1120 and 1280 (broad), a C=C stretching band at 1648 and unsaturated C—H stretching band at 3030 cm.$^{-1}$.

*Analysis.*—Calculated for $C_8H_{12}O_3S$ (percent): C, 51.04; H, 6.43; S, 17.03. Found (percent): C, 52.11; H, 6.55; S, 16.91.

EXAMPLE 8

9-thiabicyclo[3.3.1]-6-nonen-2-yl isothiocyanate

A mixture of 17.5 grams (0.1 mole) of 6-chloro-9-thiabicyclo[3.3.1]-2-nonene, 7.6 grams of ammonium thiocyanate and 800 milliliters of methyl ethyl ketone was stirred and refluxed for two hours, cooled, filtered to remove inorganic salts, the filtrate evaporated to one-tenth volume, and the crystallized solids filtered out to obtain 12.5 grams (63 percent yield) of colorless crystals, melting point 93–94 degrees centigrade. The infrared spectrum (Nujol mull) shows bands at 2080 and 2175 cm.$^{-1}$ (broad, characteristic of —N=C=S).

*Analysis.*—Calculated for $C_9H_{11}NS_2$ (percent): C, 54.78; H, 5.62; S, 32.5; N, 7.1. Found (percent): C, 54.69; H, 5.59; S, 32.5; N, 6.94.

By reaction with methanol at reflux, a crystalline methyl thiocarbamate is produced, identified by the presence of an —NH—, and a $CH_3$ band in the infrared spectrum.

At one percent concentration in aqueous dispersion, the above isothiocyanate gave 100 percent kill of houseflies (*Musca domestica*) in 24 hours.

EXAMPLE 9

Preparation of 9-thiabicyclo[3.3.1]-2-nonen-6-yl N-methyldithiocarbamate

A mixture of 17.5 parts of 6-chloro-9-thiabicyclo[3.3.1]-2-nonene and 31 parts of a 41.6 percent alcohol solution of sodium methyldithiocarbamate is stirred and heated on the steam bath for one hour. Then benzene is added to dissolve the organic product, and the benzene solution is washed with water to remove salts (titration shows the salts to be substantially sodium chloride). The benzene solution is then stripped free of solvent to leave the desired product as a reddish oil in an adequate state of purity for pesticidal use.

*Analysis.*—Calculated for $C_{10}N_{15}NS_3$ (percent): S, 39.2. Found (percent): S, 35.0.

When admixed with nematode-infested soil at 147 pounds per acre, this product gave substantial reduction of root knot disease of cucumber seedlings, indicating nematocidal activity.

EXAMPLE 10

Preparation of 9-thiabicyclo[3.3.1]-6-nonen-2-yl N,N-dimethyldithiocarbamate

A mixture of 25 parts of 6-chloro-9-thiabicyclo[3.3.1]-2-nonene and 70.6 parts of a 40.5 percent aqueous solution of sodium dimethyldithiocarbamate was stirred and heated at 100 degrees centigrade for one hour. The mixture was cooled and filtered. The solids thus obtained were dissolved (except for small amount of salts) in hot benzene, the solution filtered, the filtrate diluted with hexane and chilled. There was obtained 30 parts of a light yellowish solid, melting point 124 to 126 degrees centigrade.

*Analysis.*—Calculated for $C_{11}H_{17}NS_3$ (percent): N, 5.4; S, 37.1. Found (percent): N, 5.2; S, 37.0.

When admixed with nematode-infested soil at 147 pounds per acre, this product gave substantial reduction of root knot disease of cucumber seedlings, indicating nematocidal activity.

EXAMPLE 11

Preparation of 9-thiabicyclo[3.3.1]-2-nonen-6-yl N,N-diethyldithiocarbamate

The procedure of the preceding example was followed, using sodium diethyldithiocarbamate to obtain a light yellowish crystalline product, melting point 105 to 106 degrees centigrade.

*Analysis.*—Calculated for $C_{13}H_{21}NS_3$ (percent): N, 4.9; S, 33.4. Found (percent): N, 4.3; S, 33.5.

By refluxing 5 parts of the above product in 50 percent aqueous methanol with 5 parts of sodium hydroxide for one day under nitrogen atmosphere, followed by acidification of the resultant solution by addition of dilute hydrochloric acid and filtration of the resultant precipitate, there was obtained 3 parts of 6-mercapto-9-thiabicyclo[3.3.1]-2-nonene as a colorless waxy solid.

EXAMPLE 12

Preparation of O,O-dimethyl S-(9-thiabicyclo[3.3.1]-2-nonen-6-yl)phosphorodithioate To a mixture of 5 parts of triethylamine and 8.6 parts of O,O-dimethyl phosphorodithiolate in 25 parts of benzene was added 8.7 parts of 6-chloro-9-thiabicyclo[3.3.1]-2-nonene, and the mixture refluxed for 3 hours. It was then filtered, the filtrate washed with dilute sodium bicarbonate solution, dried over magnesium sulfate, filtered and evaporated to an oil which solidified. This was recrystallized from benzene-heptane to obtain a colorless crystalline solid, melting point 85 to 86 degrees centigrade.

*Analysis.*—Calculated for $C_{10}H_{17}O_2S_3P$ (percent): P, 10.46. Found (percent): P, 10.23.

EXAMPLE 13

Preparation of O,O-diethyl S-(9-thiabicyclo[3.3.1]-2-nonen-6-yl)phosphorodithioate The procedure of the preceding example was used, employing 10 parts of O,O-diethyl phosphorodithiolate. The product was a light brown oil, $n_D^{25}$ 1.5675.

*Analysis.*—Calculated for $C_{12}H_{21}O_2S_3P$ (percent): P, 9.55. Found (percent): P, 9.71.

EXAMPLE 14

Improved process for preparation of O,O-dimethyl S-(9-thiabicyclo[3.3.1]-2-nonen-6-yl)phosphorodithioate A mixture of 1047 grams (6 moles) of 6-chloro-9-thiabicyclo[3.3.1]-2-nonene (prepared as in Example 1) and 1106 grams of O,O-dimethyl phosphorodithioate in 2250 milliliters of toluene solution was heated gradually to 95–100 degrees centigrade over two hours. At about 40–45 degrees centigrade, hydrogen chloride evolution began and continued at a brisk rate as the temperature was raised. The reaction mixture was held at 95–100 degrees centigrade for two hours by which time the hydrogen chloride evolution rate was very slight. The reaction mixture was then decanted from a small quantity of heavy semisolid and the decantate partially stripped under vacuum, diluted with hexane, and then chilled. The resultant solids were filtered out and washed with hexane to obtain 1839 grams of O,O-dimethyl S-(9-thiabicyclononenyl)phosphorodithioate, melting point 85 to 86 degrees centigrade, found by infrared to be the same compound as was produced by the reaction of the sodium salt of the O,O-dimethyl phosphorodithiolate with 6-chloro-9-thiabicyclo-[3.3.1]-2-nonene.

In like manner, 6-chloro-9-thiabicyclo[3.3.1]-2-nonene is reacted with O-ethyl methylphosphonodithioic acid to obtain O-ethyl S-(9 - thiabicyclo[3.3.1] - 2 - nonen-6-yl) methylphosphonodithioate, an amber syrup. In like manner, 6-chloro-9-thiabicyclo[3.3.1]-2-nonene is reacted with dimethylphosphinodithioic acid to obtain S-(9-thiabicyclo[3.3.1]-2-nonen-6-yl)dimethylphosphinodithioate.

EXAMPLE 15

Improved process for preparation of O,O-diethyl S-(9-thiabicyclo[3.3.1]-2-nonen-6-yl)phosphorodithioate In the manner of the preceding example, equimolar quantities of O,O-diethyl phosphorodithiolate and 6-chloro-9-thiabicyclo[3.3.1]-2-nonene were heated together in toluene up to 95–100 degrees centigrade and held for two hours until hydrogen chloride evolution was complete. The reaction mixture, a clear solution, was then evaporated at 0.1 millimeter of pressure and 100 degrees centigrade (final pot temperature) to obtain O,O-diethyl S-(9-thiabicyclo[3.3.1]-2-nonen-6-yl)phosphorodithioate as a clear amber liquid having the correct phosphorus and sulfur analysis.

EXAMPLE 16

O,O-dimethyl S-(9-thiabicyclo[3.3.1]-2-nonen-6-yl) phosphorodithioate 9-oxide

To a solution of 29.6 grams (0.1 mole) of O,O-dimethyl S-9-thiabicyclononenyl phosphorodithioate (prepared as described above) in 100 milliliters of acetone was added 12 milliliters of 30 percent aqueous hydrogen peroxide (0.105 mole) with stirring and cooling below 32 degrees centigrade over the course of one half hour. After stirring the mixture for one hour more, the solvent was stripped to a pot temperature of 35 degrees centigrade at 0.1 millimeter. The residual crude product was then recrystallized from benzene-heptane mixture to obtain 21.9 grams of O,O-dimethyl S-9-thiabicyclononenyl phosphorodithioate 9-oxide, melting point 90.5–116.5 degrees centigrade or 119–132 degrees centigrade (two successive crops). The product appears to be a mixture of two stereoisomers, both of which have the characteristic sulfoxide infrared band at 1060 cm.$^{-1}$, and both of which have the correct sulfur and phosphorus analysis.

EXAMPLE 17

O,O-dimethyl S-(9-thiabicyclo[3.3.1]-2-nonen-6-yl) phosphorothioate

A mixture of 17.5 grams (0.1 mole) of chloro-9-thiabicyclononene and 17.5 grams (0.11 mole) of ammonium O,O-dimethyl phosphorothioate in 500 milliliters of methyl ethyl ketone was stirred at 19–25 degrees centigrade for 20 hours. The mixture was then filtered to remove ammonium chloride, and the filtrate was then evaporated to 50 degrees centigrade at 0.05 millimeter of final pressure to obtain the desired product as a viscous oil.

Analysis.—Calculated for $C_{10}H_{17}O_3S_2P$ (percent): P, 11.1. Found (percent): P, 11.2.

EXAMPLE 18

O,O-diethyl S-(9-thiabicyclo[3.3.1]-2-nonen-6-yl) phosphorothioate

In a similar manner to the preceding example, 17.5 grams of chloro-9-thiabicyclononene and 20.6 grams of ammonium O,O-diethyl phosphorothioate were reacted in 500 milliliters of methyl ethyl ketone, to obtain the desired product as a viscous oil.

Analysis.—Calculated for $C_{12}H_{21}O_3S_2P$ (percent): P, 10.0. Found (percent): P, 10.1.

EXAMPLE 19

Diethyl 9-thiabicyclo[3.3.1]-2-nonen-6-yl phosphate

A mixture of 35 grams (0.2 mole) of chloro-9-thiabicyclononene and 72.8 grams of triethyl phosphate was heated gradually up to 180 degrees centigrade over two hours. Ethyl chloride was evolved and substantially the theoretical 0.2 mole of it was collected in a chilled trap connected to the reactor. The excess triethyl phosphate was then stripped off to a pot temperature of 70 degrees centigrade at 0.1 millimeter. The residual product was cooled and a liquid by-product decanted from the semisolid product which formed a separate heavier layer. This product had the substantially correct analysis for the desired phosphate.

Analysis.—Calculated for $C_{12}H_{21}O_4SP$ (percent): P, 10.6. Found (percent): P, 9.3.

EXAMPLE 20

Preparation of O,O-diethyl O-(9-thiabicyclo[3.3.1]-2-nonen-6-yl)phosphorothioate A mixture of 10 parts of 6-hydroxy-9-thiabicyclo[3.3.1] nonene, 5.65 parts of piperidine, 14 parts of O,O-diethyl phosphorochloridodithioate and 10 parts of benzene was stirred for 12 hours at 40 degrees centigrade. Then the mixture was washed with cold water, the organic layer separated and dried over anhydrous magnesium sulfate, filtered, and evaporated to 100 degrees centigrade pot temperature at 0.25 millimeter of final pressure, to obtain 17 parts of pale brownish oil.

Analysis.—Calculated for $C_{12}H_{11}O_3PS_2$ (percent): P, 10.4; S, 21.5. Found (percent): P, 11.6; S, 21.1.

EXAMPLE 21

O,O-diethyl S-(9-thiabicyclo[3.3.1]-2-nonen-6-yl) phosphorothioate 9-oxide

To 100 grams of O,O-diethyl S-(9-thiabicyclo[3.3.1]-2-nonen-6-yl)phosphorothioate in 100 milliliters of acetic acid was added 36.8 grams of 30 percent hydrogen peroxide at 15 degrees centigrade with cooling and stirring, then after 24 hours the reaction mixture was stripped free of solvent under vacuum, leaving the desired product as 108 grams of a brownish syrup, the infrared spectrum of which showed the characteristic sulfoxide band at 1060 cm.$^{-1}$.

Analysis.—Calculated for $C_{12}H_{21}O_4S_2P$ (percent): P, 9.57. Found (percent): P, 9.55.

EXAMPLE 22

O,O-diethyl S-(9-thiabicyclo[3.3.1]-2-nonen-6-yl)phosphorothioate 9,9-dioxide

The previous procedure was followed, using 73.6 grams of 30 percent hydrogen peroxide. The product was obtained as a viscous amber syrup, exhibiting the characteristic infrared sulfone bands at 1130 and 1303 cm.$^{-1}$.

Analysis.—Calculated for $C_{12}H_{21}O_5S_2P$ (percent): P, 9.12. Found (percent): P, 9.09.

In like manner, O,O-dimethyl S-(9-thiabicyclo[3.3.1]-2-nonen-6-yl)phosphorothioate is oxidized by two molar equivalents of hydrogen peroxide to the corresponding 9,9-dioxide, a colorless crystalline solid.

EXAMPLE 23

O,O-diethyl S-(9-thiabicyclo[3.3.1]-2-nonen-6-yl) phosphorodithioate 9,9-dioxide To 45.4 grams of O,O-diethyl S-(9-thiabicyclo[3.3.1]-2-nonen-6-yl)phosphorodithioate in 150 milliliters of acetone was slowly added at 20–25 degrees centigrade with stirring a mixture of 31.5 grams of potassium permanganate, 38 grams of magnesium sulfate, 100 milliliters of water, and 100 milliliters of acetone. The mixture was then stirred for 15 minutes longer, the sulfur dioxide was passed in until the mixture became colorless. The product was then extracted with 200 milliliters of chloroform, the extract washed with dilute sodium bicarbonate, dried over magnesium sulfate, filtered, and evaporated to obtain the desired product as a light yellowish syrup which was further purified by filtration with fuller's earth. The infrared spectrum established the presence of the P=S and the —SO$_2$— groups.

Analysis.—Calculated for $C_{12}H_{21}O_4S_3P$ (percent): S, 26.9. Found (percent): S, 27.40.

The compound was purified by chromatography on a Florisil column and found to be a colorless crystalline solid, melting point 70–71 degrees centigrade.

EXAMPLE 24

O,O-diethyl S-9-thiabicyclo[3.3.1]-2-nonenyl phosphorodithioate 9-oxide

The process of the preceding example was followed, using only 15.8 grams of permanganate. The product isolated by chromatography on Florisil was a pale yellowish syrup, the infrared spectrum of which exhibited bands characteristic of P=S and —SO— structures.

Analysis.—Calculated for $C_{12}H_{21}O_3S_3P$ (percent): S, 28.2. Found (percent): S, 27.7.

In like manner, O,O-dimethyl S-(9-thiabicyclo[3.3.1]-2-nonen-6-yl)phosphorodithioate is oxidized by potassium permanganate to obtain the 9-oxide and the 9,9-dioxide, which are colorless solids isolated by column chromatography.

EXAMPLE 25

Preparation of 6-anilino-9-thiabicyclo[3.3.1]-2-nonene

A mixture of 8.7 parts of 6-chloro-9-thiabicyclo[3.3.1]-2-none and 50 parts of aniline was heated at 100 degrees for one hour, then stripped to a pot temperature of 100 degrees centigrade at 0.1 millimeter. To the residue was added an excess of dilute aqueous caustic soda and ethyl ether. The insoluble solids were filtered out, washed with water and ether, and dried in vacuum to obtain 7 parts of tan crystals, melting point 112 to 114 degrees centigrade (melting point 116 to 116.5 degrees centigrade after recrystallization from aqueous alcohol).

*Analysis.*—Calculated for $C_{14}H_{16}SN$ (percent): N, 6.09. Found (percent): N, 6.16.

EXAMPLE 26

Preparation of N-(9-thiabicyclo[3.3.1]-2-nonenyl) pyridinium chloride

A solution of 8 parts of 6-chloro-9-thiabicyclo[3.3.1]-2-nonenyl pyridinium chloride and 5 parts by volume of pyridine in 100 parts of ether was refluxed for one week, cooled and filtered to obtain water-soluble colorless needles.

*Analysis.*—Calculated for $C_{16}H_{16}SNCl$ (percent): N, 4.84. Found (percent): N, 4.82.

By admixing 250 parts per million of this product into nutrient agar, the growth of *Staphylococcus aureus* on the agar medium was almost entirely prevented.

EXAMPLE 27

Preparation of N-(9-thiabicyclo[3.3.1]-2-nonenyl)-N,N-dimethyl-N-stearylammonium chloride A mixture of 13.5 parts of dimethylstearylamine, 8.7 parts of 6-chloro-9-thiabicyclo[3.3.1]-2-nonene and 10 parts by volume of methanol was heated with steam for si xhours, then stripped free of methanol by application of vacuum at 100 degrees centigrade. The product was a waxy semi-solid, soluble in water to give soapy solutions. The product was an effective surfactant; one percent solutions in water readily emulsified benzene and other oils. The product also retarded the growth of *Staphylococcus aueus* at 60 p.p.m. in agar.

EXAMPLE 28

Preparation of 6-phenylthio-9-thiabicyclo[3.3.1]-2-nonene

To a solution of 7 parts of sodium thiophenolate in 20 parts by volume of methanol was added 8.7 parts of 6-chloro-9-thiabicyclo[3.3.1]-2-nonene and the mixture heated at reflux for 15 minutes, then diluted with water. The oil which separated was washed with aqueous caustic soda, then with water, and dried by heating to 100 degrees centigrade under 0.2 millimeter presure. The product comprised 9 parts of colorless oil, $n_D^{25}$ 1.6271.

*Analysis.*—Calculated for $C_{14}H_6S_2$ (percent): S, 25.8. Found (percent): S, 25.7.

EXAMPLE 29

6-cyano-9-thiabicyclo[3.3.1]-2-nonene

To a solution of 10 grams (0.20 mole) of sodium cyanide in 10 milliliters of water and 40 milliliters of methanol was added 17.4 grams (0.1 mole) of 6-chloro-9 - thiabicyclo[3.3.1] - 2 - nonene and the mixture refluxed for 15 minutes, then diluted with warm water, the oil separated off, washed with warm water, and dried at 100 degrees centigrade under 20 millimeters vacuum. The resultant 11 grams of waxy solid after recrystallization from aqueous methanol melted at 59–59.5 degrees centigrade.

*Analysis.*—Calculated for $C_9H_{11}NS$ (percent): C, 65.40; H, 6.71; N, 8.48; S, 19.40. Found (percent): C, 65.11; H, 6.60; N, 8.38; S, 19.58.

EXAMPLE 30

9-thiabicyclo[3.3.1]-6-nonene-2-carboxamide and 9-thiabicyclo[3.3.1]-6-nonene-2-carboxylic acid A solution of 5 grams (0.03 mole) of the nitrile, 4 grams of potassium hydroxide, and 25 milliliters of ethanol was refluxed for 5 hours, cooled, and the precipitated crystals filtered out. This product amounted to 3 grams (55 percent yield) of colorless crystalline amide, melting point 208–209 degrees centigrade.

*Analysis.*—Calculated for $C_9H_{13}ONS$ (percent): C, 58.98; H, 7.15; N, 7.64; S, 17.49. Found (percent): C, 58.85; H, 7.03; N, 7.69; S, 17.27.

The filtrate containing the potassium salt of the acid was evaporated free of ethanol, the residue dissolved in water, and acidified with hydrochloric acid. The precipitated solid was extracted with ether, re-extracted with sodium hydroxide, the solution acidified, and the product filtered out as colorless needles, melting point 155–156 degrees centigrade. Recrystallization from aqueous ethanol raised the melting point to 157–158 degrees centigrade.

*Analysis.*—Calculated for $C_9H_{12}O_2S$ (percent): C, 58.66; H, 6.56; S, 17.40 (neutralization equivalent 185). Found (percent): C, 58.87; H, 6.72; S, 17.22 (neutralization equivalent 186).

By treatment of this acid with excess thionyl chloride for six hours at reflux followed by evaporation of the excess thionyl chloride, the acid chloride is obtained as a colorless wax. This when heated for 10 hours with excess butyl alcohol yields the butyl ester as a colorless nonvolatile oil. The ester when incorporated into a polyvinyl chloride plastisol exerts a plasticizing action.

EXAMPLE 31

Preparation of 6-iodo-9-thiabicyclo[3.3.1]-2-nonene

To 15 parts of sodium iodide in 100 parts by volume of acetone was added 8.7 parts of chloro-9-thiabicyclo-2-nonene and the mixture warmed briefly to 50 degrees centigrade, then evaporated free of solvent, water added to dissolve the salts, and the heavy oil which separated was drawn off and washed with water. The product when dried over magnesium sulfate amounted to 10 parts of dark heavy oil, $n_{25}^D$ 1.6465.

*Analysis.*—Calculated for $C_8H_{11}SI$ (percent): I, 47.8. Found (percent): I, 47.8.

EXAMPLE 32

6-methoxy-9-thiabicyclo[3.3.1]-2-nonene (a) *By use of sodium methoxide.*—A solution of 120 grams (0.7 mole) of 6-chloro - 9 - thiabicyclo[3.3.1]-2-nonene and 41.3 grams (0.76 mole) of sodium methylate in 200 milliliters of methanol was refluxed for 15 minutes, cooled, filtered to remove salt, the alcohol distilled off, and the residual oil distilled through a 6 inch Vigreux column to obtain 80 grams (67 percent yield) of colorless liquid, boiling point 133–137 degrees centigrade (13 millimeters) $n_{24.5}^D$ 1.5379.

*Analysis.*—Calculated for $C_9H_{14}OS$ (percent): C, 63.48; H, 8.29; S, 18.83. Found (percent): C, 62.84; H, 8.31; S, 18.53.

(b) *By methanolysis in the absence of base.*—A solution of 21.1 grams (0.1 mole) of 6-chloro - 9 - thiabicyclo[3.3.1] - 2 - nonene and 100 milliliters of methanol was refluxed for 12 hours, then partitioned between 100 milliliters of hexane and 100 millilitiers of water, the hexane layer washed with water, dried over magnesium sulfate, and evaporated on the steam bath to obtain as residue 16 grams of colorless oil, shown by infrared to be almost pure 6 - methoxy - 9 - thiabicyclo[3.3.1]-2-nonene.

EXAMPLE 33

Preparation of 6-(2,4-dichlorophenoxy)-9-thiabicyclo[3.3.1]-2-nonene

A solution of 10 parts of sodium 2,4-dichlorophenate, 8.7 parts of chloro - 9 - thiabicyclo - 2 - nonene and 50 parts by volume methyl ethyl ketone was heated 80 minutes. The solvent then was evaporated, and the organic product extracted from the residue by means of methylene chloride. The product solution was washed with aqueous caustic and with water, then evaporated under reduced pressure to a pot temperature of 100 degrees (0.2 millimeter) leaving 9 parts of colorless oily product, $n_{25}^D$ 1.6044.

*Analysis.*—Calculated for $C_{14}H_{14}OSCl_2$ (percent): Cl, 23.6. Found (percent): Cl, 23.5.

EXAMPLE 34

6-phenoxy-9-thiabicyclo[3.3.1.]-2-nonene

To a solution of sodium phenate, prepared from 48 grams (0.51 mole) of penol and 12.6 grams (0.55 mole) of sodium in 300 milliliters of tetrahydrofuran was added 90 grams (0.51 mole) of 6-chloro-9-thiabicyclo[3.3.1]-2-nonene, the solution refluxed for one half hour, cooled, flltered, the filtrate evaporated to remove solvent, and the residue distilled through a 6 inch Vigreuz column to obtain 91 grams (77 percent yield) of colorless solid, boiling point 167–170 degrees centigrade (0.3 millimeter), melting point 76–76.5 degrees centigrade (recrystallized from aqueous ethanol).

*Analysis.*—Calculated for $C_{14}H_{16}OS$ (percent): C, 72.37; H, 9.64; S, 13.80. Found (percent). C, 72.59; H, 7.24; S, 13.73.

EXAMPLE 35

9-thiabicyclo[3.3.1]-6-non-2-yl acetate (a) *By use of a sodium acetate.*—A mixture of 174.5 grams (1.0 mole) of 6-chloro-9-thiabicyclo[3.3.1]-2-nonene, 98.4 grams (1.2 mole) of sodium acetate, and 225 milliliters of glacial acetic acid was stirred and heated on the steam bath for one day, then cooled, filtered, diluted with water to precipitate the product, and refiltered to obtain 184 grams of solid, melting point 50–52 degrees centigrade. Recrystallization yielded 122 grams of colorless crystalline product, melting point 51–52 degrees centigrade.

*Analysis.*—Calculated for $C_{10}H_{14}O_2S$ (percent): C, 60.57; H, 7.12; S, 16.17. Found (eprcent): 60.19; H, 7.10; S, 16.17.

(b) *By use of glacial acetic acid.*—A mixture of 21.1 grams (0.1 mole) of 6-chloro-9-thiabicyclo[3.3.1]-2-nonene and 50 milliliters of glacial acetic acid was refluxed until the theoretical amount of hydrogen chloride was evolved and collected in a water-filled trap (12 hours). The solution was cooled, poured into water, the organic product (oil) extracted with methylene chloride, washed with water, and sodium bicarbonate solution, and the solvent evaporated to obtain 20 grams of colorless semi-solid product. The infrared spectrum showed this was mainly the acetate as made by method (a). Recrystallization from acetic acid and sublimation at 100 degrees centigrade (0.6 millimeter) yielded 13.2 grams of the crystalline product, melting point 52–53 degrees centigrade.

EXAMPLE 36

Bean plants infested with mites (*Tetranychus telarius*) were sprayed with aqueous dispersions of O,O-dimethyl S(9-thiabicyclononenyl)phosphorodithioate and O,O-diethyl S-(9-thiabicyclononenyl)phosphorodithioate at various concentrations, also for comparison a commercial miticide was sprayed on adjacent mite-infested plants. The percent mortality after 24 hours was then determined, with the following results:

| Chemical | Percent mortality at concentration indicated | | |
|---|---|---|---|
| | 1,000 p.p.m. | 125 p.p.m. | 62 p.p.m. |
| O,O-dimethyl S-(9-thiabicyclo-[3.3.1]-2-nonen-6-yl) phosphorodithioate | 100 | 94 | 77 |
| O,O-diethyl S-(9-thiabicyclo-[3.3.1]-2-nonen-6-yl)phosphorodithioate | 100 | 99 | 99 |
| Malathion (commercial standard) | 100 | 80 | 40 |

EXAMPLE 37

Nasturtium plants with black bean aphids were sprayed with 0.025 percent aqueous dispersions of O,O-dimethyl S-(9-thiabicyclo[3.3.1]-2-nonen - 6 - yl)phosphorodithioate and O,O-diethyl S-(9-thiabicyclo[3.3.1]-2-nonen-6-yl)phosphorodithioate. After 24 hours, 100 percent mortality of the aphids was observed.

EXAMPLE 38

Various of the chemicals of the invention were sprayed in aqueous dispersions at the concentrations indicated on the following table, onto a number of insects of economically important species. The percentage kill was noted after 48 hours, with the following results being obtained:

PERCENTAGE KILL (AT CONCENTRATION INDICATED)

| | Houseflies | Aphids | Mexican bean beetles | Mites (*T. telarius*) | Mites (systemic test)* |
|---|---|---|---|---|---|
| O,O-dimethyl S-(9-thiabicyclo-[3.3.1]-2-nonen-6-yl) phosphorodithioate | 100 (1%) | 100 (15 p.p.m.) | 100 (500 p.p.m.) | 72 (500 p.p.m.) | 100 (32 lbs./acre. |
| O,O-diethyl S-(9-thiabicyclo-[3.3.1.]-2-nonen-6-yl) phosphorothioate | 100 (0.1%) | 100 (7 p.p.m.) | 100 (62 p.p.m.) | 100 (62 p.p.m.) | Do. |
| O,O-diethyl O-(9-thiabicyclo-[3.3.1]-2-nonen-6-yl) phosphorodithioate | 100 (15 p.p.m.) | 100 (30 p.p.m.) | 100 (125 p.p.m.) | 100 (250 p.p.m.) | Do. |
| O,O-dimethyl S-(9-thiabicyclo-[3.3.1]-2-nonen-6-yl) phosphorodithioate 9-oxide | 100 (1%) | 100 (30 p.p.m.) | 100 (250 p.p.m.) | 100 (62 p.p.m.) | Do. |
| O,O-diethyl S-(9-thiabicyclo-[3.3.1]-2-nonen-6-yl) phosphorodithioate 9-oxide | | 100 (125 p.p.m.) | 100 (62 p.p.m.) | 100 (125 p.p.m.) | Do. |
| O,O-diethyl S-(9-thiabicyclo-[3.3.1]-2-nonen-6-yl) phosphorodithioate 9,9-dioxide | | | 100 (31 p.p.m.) | | |

*Compound applied to the soil in which mite-infested nasturtiums were grown, and two days allowed for uptake before measuring mite kill.

EXAMPLE 39

Soil heavily infested with Pythium, a fungus which causes damping off of seedlings, was admixed at the rate of 32 pounds per acre with N-(9-thiabicyclo[3.3.1]-2-nonen - 6 - yl)methanesulfonamide. Peas planted in the treated soil germinated and grew normally, whereas peas planted in similarly infested but untreated soil were destroyed by damping off.

The same infested soil treated with 32 pounds per acre of N - (9-thiabicyclo[3.3.1]-2-nonen-6-yl)-N'-n-butylurea permitted 90 percent germination and emergence of healthy seedlings.

EXAMPLE 40

A piece of cardboard impregnated at the rate of 10 milligrams/square inch with the N,N-diethylamide of 9-thiabicyclo[3.3.1]-2-nonene-2-carboxylic acid (prepared by treating the acid chloride with diethylamine) was placed in the midst of a colony of German cockroaches. The roaches avoided the treated paper, indicating the chemical to have repellent action. Similar activity is observed with the sulfoxide of this amide.

EXAMPLE 41

Adult houseflies were treated with a 0.1 percent aqueous dispersion of 6-phenylmercapto - 9 - thiabicyclo[3.3.1]-2-nonene. In two hours, 100 percent of the flies were prostrate, and in 24 hours 100 percent were dead.

EXAMPLE 42

Adult houseflies were treated with a 0.1 percent aqueous dispersion of 6-(2,4 - dichlorophenoxy) - 9 - thiabicyclo [3.3.1]-2-nonene. In two hours, 65 percent of the flies were prostrate and in 24 hours 85 percent were dead.

EXAMPLE 43

Adult houseflies were treated with a 0.1 percent aqueous dispersion of 6-anilino-9-thiabicyclo[3.3.1]-2-nonene. In two hours, 70 percent of the flies were prostrate and in 24 hours, 70 percent were dead.

EXAMPLE 44

A piece of heavy paper 4 inches by 7 inches impregnated with 50 milligrams of 9-thiabicyclo[3.3.1]-6-nonen-2-ol was placed in a beaker containing three dozen German cockroaches along with a similar piece of paper not treated with the chemical. The cockroaches walked freely on the untreated paper but were observed to avoid walking upon the treated paper.

Similar repellency is observed with ethers, esters, and the sulfoxide of the aforementioned alcohol.

EXAMPLE 45

Formulation as emulsifiable concentrate

The following ingredients were blended:

O,O-diethyl S-(9-thiabicyclo[3.3.1] - 2 - nonen-6-yl) phosphorodithioate—2 pounds
Emcol H300X (blended polyoxyethylene-alkylarylsulfonate emulsifier)—0.2 pound
Emcol H500X (blended polyoxyethylene-alkylarylsulfonate emulsifier)—0.2 pound
Xylene—to 1 gallon The resultant solution is emulsified with water and sprayed onto fruit trees at the rate of 0.5 pound of active ingredient per acre to control mites.

EXAMPLE 46

Formulation as wettable powder

The following ingredients were ground together in a hammermill:

| | Parts by wt. |
|---|---|
| S-9-Thiabicyclo[3.3.1]-2-nonen - 6 - yl ester of N,N-diethylthiolcarbamic acid | 50 |
| Marasperse N (ligninsulfonate dispersing agent) | 4 |
| Sorbit P (alkylarylsulfonate wetting agent) | 2.5 |
| Microcel E (synthetic calcium silicate carrier) | 43.5 |

The resultant powder is dispersed in water and sprayed onto plowed and disced soil for pre-emergence weed control.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A compound of the structure

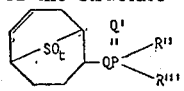

wherein Q and Q' are selected from the group consisting of elements from Group VI of the Periodic Table having an atomic number of from 8 to 16, R'' and R''' are selected from the group consisting of alkyl of 1 to about 12 carbon atoms, alkoxy of 1 to about 12 carbon atoms, and alkylthio of 1 to about 12 carbon atoms and $t$ is a number from 0 to 2.

2.

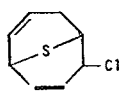

3.

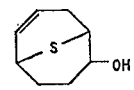

4.

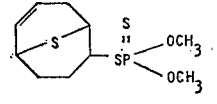

5.

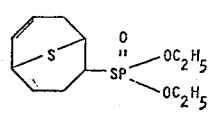

6.

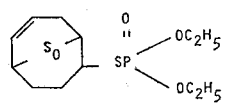

7.

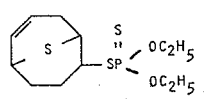

8.

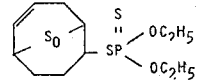

9.

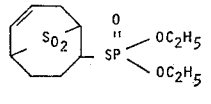

10.

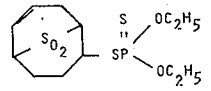

11. A compound of the structure

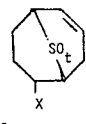

wherein $t$ is a number from 0 to 2, and X is halogen.

12. A compound of the structure

wherein $t$ is a number 0 to 2.

13. A compound of the structure

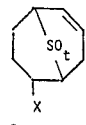

wherein $t$ is a number from 0 to 2, and X is mercapto.

14. A process for the preparation of a compound of the formula

wherein X is halogen comprising subjecting a dihalo-9- thiabicyclononane to heat until substantially one molar equivalent of hydrogen halide is evolved.

15. A process for the preparation of a compound of the formula

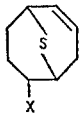

wherein X is halogen which comprises heating dihalogen-9-thiabicyclononane at a temperature from between about 110 degrees centigrade to about 220 degrees centigrade until substantially one molar equivalent of hydrogen chloride is evolved.

16. The process of claim 17 wherein X is chlorine.

References Cited

Smith, Open Chain N-Cpds. (Benjamin, N.Y., 1965), vol. I, pp. 244–8.

HENRY R. JILES, Primary Examiner

C. M. SHURKO, Assistant Examiner

U.S. Cl. X.R.

71—90, 91; 252—45, 47, 48.2, 49; 260—247.1, 293.4 E, 294.8 D; 424—248, 266, 267, 275